United States Patent Office  
3,198,810  
Patented Aug. 3, 1965

3,198,810  
BICYCLIC ESTER-LACTONES  
James C. Wygant, Creve Coeur, and Erhard J. Prill, Des Peres, Mo., assignors to Monsanto Company, St. Louis, Mo., a corporation of Delaware  
No Drawing. Continuation of application Ser. No. 144,589, Oct. 12, 1961. This application Aug. 3, 1964, Ser. No. 387,204  
3 Claims. (Cl. 260—343.3)

This application is a continuation of our prior copending application Serial No. 144,589, filed October 12, 1961, now abandoned in favor of this application.

This invention relates to ester-lactones. In one aspect, this invention relates to bicyclic ester-lactones of the alkyl-$\Delta^4$-tetrahydrophthalic anhydrides. In another aspect, this invention relates to methods for producing bicyclic ester-lactones of alkyl-$\Delta^4$-tetrahydrophthalic anhydrides. In another aspect, this invention relates to methods for the alcoholysis/lactonization of alkyl-$\Delta^4$-tetrahydrophthalic anhydrides.

In our copending application Serial No. 34, filed January 4, 1960, we disclosed and claimed a process for the preparation of ester-lactones of alkenylsuccinic anhydrides by alcoholysis of the alkenylsuccinic anhydride to form an acid-ester and then acid-catalyzed lactonization of the acid-ester to form an ester-lactone of the alkenylsuccinic anhydride. Attempts to form the ester-lactones of the $\Delta^4$-tetrahydrophthalic anhydrides by a similar process have resulted in failure with only the formation of diesters, not ester-lactones.

We have now discovered, much to our surprise, that the ester-lactones of the $\Delta^4$-tetrahydrophthalic anhydrides can be formed by an alcoholysis/lactonization process by substituting an alkyl substituent on the ethylenic linkage of the $\Delta^4$-tetrahydrophthalic anhydride.

An object of this invention is to provide a process for producing a bicyclic ester-lactone from an alkyl-$\Delta^4$-tetrahydrophthalic anhydride.

Another object of this invention is to provide a process for reacting an alkyl-$\Delta^4$-tetrahydrophthalic anhydride with a monohydric alcohol to form a bicyclic ester-lactone.

Another object of this invention is to provide a process for esterifying an alkyl-$\Delta^4$-tetrahydrophthalic anhydride to form an acid-ester of said alkyl-$\Delta^4$-tetrahydrophthalic anhydride.

Another object of this invention is to provide a process for lactonization of an acid-ester of an alkyl-$\Delta^4$-tetrahydrophthalic anhydride to form a bicyclic ester-lactone.

Another object of this invention is to provide bicyclic ester-lactones of an alkyl-$\Delta^4$-tetrahydrophthalic anhydrides as new compounds.

Other objects and advantages of this invention will be apparent to one skilled in the art upon studying this disclosure.

In accordance with this invention, an alkyl-$\Delta^4$-tetrahydrophthalic anhydride is reacted with a monohydric alcohol to form a bicyclic ester-lactone. The reactants are initially reacted preferably in the absence of a catalyst and then an acid-type catalyst is employed to complete the reaction. The initial phase of the reaction involves opening of the heterocyclic ring of the alkyl-$\Delta^4$-tetrahydrophthalic anhydride and partial esterification thereof as illustrated by Equation 1:

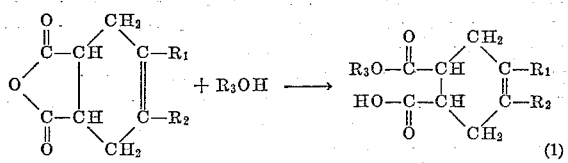

(1)

wherein $R_1$ is selected from the group consisting of hydrogen and alkyl, $R_2$ is alkyl, and $R_3$ is hydrocarbyl. The final phase of the reaction requires the use of a catalyst and involves intramolecular cyclization of the acid-ester to form a bicyclic lactone substituted with an ester group, as illustrated by Equation 2:

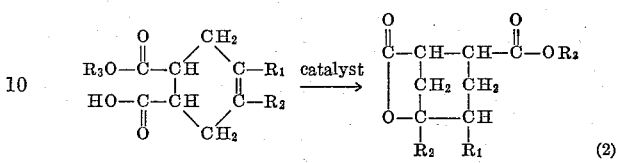

(2)

wherein $R_1$, $R_2$ and $R_3$ are as above defined. The use of catalyst in the initial phase of the reaction tends to result in the formation of diesters instead of acid-esters or partial esters, and the formation of the diester prevents the intramolecular cyclization in the final phase to form the bicyclic ester-lactone.

Further, in accordance with this invention, there are provided, as new compounds, bicyclic ester-lactones of the formula

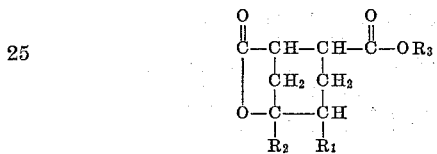

wherein $R_1$, $R_2$ and $R_3$ are as above defined.

The alkyl - $\Delta^4$ - tetrahydrophthalic anhydride reactants suitable for use in this invention have alkyl groups on either one or both of the carbon atoms comprising the ethylenic unsaturation. There must be at least one alkyl group, as represented by $R_2$ in the formula above, in order for the $\Delta^4$-tetrahydrophthalic anhydride to be converted into the bicyclic ester-lactone in substantial yield; $\Delta^4$-tetrahydrophthalic anhydrides free of such alkyl substitution cannot satisfactorily be converted into the bicyclic ester-lactone. Thus, $R_1$ in the formula above may be either hydrogen or alkyl but $R_2$ must always be alkyl. The alkyl radicals, as represented by $R_1$ and $R_2$, are lower alkyl radicals and ordinarily are alkyl radicals having not more than 6 carbon atoms. Examples of some suitable alkyl radicals include methyl, ethyl, isopropyl, butyl, tert-butyl, hexyl, and the like. The alkyl-$\Delta^4$-tetrahydrophthalic anhydrides are known to those skilled in the art and are readily prepared by heating an alkyl-substituted butadiene, for example, 2-methyl-1,3,-butadiene, with maleic anhydride, preferably in a hydrocarbon solvent.

The monohydric alcohol reactants for use in this invention comprise the hydrocarbyl alcohols such as the alkyl alcohols, e.g., methyl, ethyl, isopropyl, hexyl, decyl, dodecyl, tridecyl, and octadecyl alcohols; the alkenyl alcohols, e.g., propenyl, methylallyl, pentenyl, and pentadecenyl alcohols; the cycloalkyl alcohols, e.g., cyclopentyl and cyclohexyl alcohols; the (cycloalkyl)alkyl alcohols, e.g., cyclohexylethyl, cyclohexylbutyl, and cyclopentylpropyl alcohols; the (alkyl) cycloalkyl alcohols, e.g., 1-methylcyclohexylmethyl, 1-(1'-methylcyclohexyl)-1-ethyl and 1-(2'-ethylcyclohexyl)-3-propyl alcohols; the aryl alcohols such as phenyl alcohol; the alkaryl alcohols, e.g., methylphenyl, ethylphenyl, and dipropylphenyl alcohols; and the aralkyl alcohols, benzyl, butylbenzyl, phenylethyl, and phenylbutyl alcohols.

Although the alcohol reactants used in the process of this invention may have as many as 32 carbon atoms in the molecule, preferably the alcohol is one which has less than 18 carbon atoms per molecule. The alcohol may be a straight-chain or a branched-chain one, and can be either a primary, secondary or tertiary alcohol. A very suitable type of branch-chain alcohol is the "Oxo" type alcohol produced by oxoration of an olefin or a lower olefin dimer, trimer, tetramer, or pentamer with carbon monoxide and hydrogen at a temperature between about 250° C. and 450° C. under a pressure of about 150–400 atmospheres in the presence of a cobalt or similar catalyst to form an aldehyde which is then catalytically hydrogenated to form an alcohol as is well known to those skilled in the art. For example, tridecyl alcohol is prepared from propylene tetramer or isobutylene trimer and carbon monoxide and hydrogen whereas hexadecyl alcohol is prepared from propylene pentamer and carbon monoxide and hydrogen.

The esterification and intramolecular cyclization reactions of this invention are usually carried out at a temperature below about 150° C. because the use of more elevated temperatures sometimes result in the formation of a substantial amount of the diester. The reactions can be conducted at temperatures as low as approximately room temperature e.g., 20° C.; however, it is usually desirable to use a temperature above room temperature, for example above 50° C., in order to have a relatively short reaction time. Ordinarily, these reactions are carried out at substantially atmospheric pressure although pressures above atmospheric may be employed with the more volatile reactants.

Usually stoichiometric amounts of the alkyl-$\Delta^4$-tetrahydrophthalic anhydride reactants and alcohol reactants are maintained in the reaction zone. However, it is sometimes desirable to use an excess of the alcohol reactant in order to drive the anhydride-opening step to completion. It is also possible to use an excess of the alkyl-$\Delta^4$-tetrahydrophthalic anhydride although the use of an excess of this reactant is usually not desirable since the unreacted material must be recovered in a purification step.

The partial esterification step of the process of this invention should be conducted in a catalyst-free system since the use of a catalyst promotes the addition of 2 moles of the alcohol reactant to each mole of the alkyl-$\Delta^4$-tetrahydrophthalic anhydride reactant thereby effecting complete esterification of the latter and resulting in the formation of a diester. The formation of the diester product is undesirable since the diester cannot be intramolecularly cyclized to form the desired bicyclic ester-lactone.

The intramolecular cyclization step involved in the process of this invention must be carried out in the presence of an acid-type catalyst in order to effect formation of the bicyclic ester-lactone. Suitable catalysts include the mineral acids such as hydrochloric, nitric, sulfuric, perchloric, and phosphoric acids; the sulfonic acids such as the alkanesulfonic acids and the arylsulfonic acids; low molecular weight aliphatic carboxylic acids such as formic and propionic acids; and sulfonic type ion exchange resin materials, such as cross-linked sulfonated polystyrene which is commercially available as Dowex-50. The alkanesulfonic acid catalysts are preferably the lower alkanesulfonic acids containing from 1 to 12 carbon atoms, for example, methanesulfonic acid, ethanesulfonic acid, propanesulfonic acid, and butanesulfonic acid. If desired, a mixture of lower alkanesulfonic acids can be used and such a mixture containing methane, ethane, and propanesulfonic acids is commercially available. Ordinarily the alkanesulfonic acid will comprise 92% to 95% sulfonic acid, from 1 to 2% sulfuric acid, and from 3 to 6% water. The arylsulfonic acid catalysts which can be used in the process of this invention include the benzenesulfonic acids, toluenesulfonic acid, and chlorobenzenesulfonic acids, with p-toluenesulfonic acid and 4-chlorobenzenesulfonic acid being preferred. The amount of catalyst present in the reaction zone can be varied over wide limits depending upon the nature of the reactants and the catalyst used. The amount of catalyst used is also determined to a considerable extent by the temperature selected for conducting the reaction. Thus, at higher temperatures the amount of catalyst required in the reaction zone is smaller than when lower temperatures are used and the use of excessive amounts of catalyst at the more elevated temperatures will promote the formation of undesired side products. Ordinarily the amount of catalyst used will be between about 0.1% up to 5% by weight of the amount of the alkyl-$\Delta^4$-tetrahydrophthalic anhydride reactant.

The partial esterification and the intramolecular cyclization steps involved in the process of this invention can be carried out either batchwise or in a continuous manner. If the reactions are carried out batchwise, the partial esterification step is conducted first and after the completion of this step, the catalyst is added to the system in order to effect the intramolecular cyclization. Ordinarily, the partial esterification step will be completed in a period of time less than approximately one-half hour; however, substantially longer periods of time may be required in some cases with particular reactants. The partial esterification step can be conducted over long periods of time if a suitable low temperature is used. After completion of the partial esterification step, the catalyst can be added directly to the reaction zone without effecting any change in the reaction conditions. If desired, the reaction mixture obtained in the esterification step can be subjected to a separation step to effect removal of any unconverted reactants. Although the catalyst promotes the formation of the diester product when the tetrahydrophthalic and alcohol reactants are brought together in the presence of the catalyst, there is no substantial formation of the diester product in the intramolecular cyclization step, depending upon the nature of the tetrahydrophthalic anhydride, even though there is an excess of the alcohol reactant present in the reaction zone, because the intramolecular cyclization step occurs more readily than the partial esterification step under these conditions.

If the process of this invention is carried out in continuous manner, the catalyst is preferably added to the system at a point after substantial completion of the partial esterification step so as not to be present in the system at a place where partial esterification of the tetrahydrophthalic anhydride and the alcohol takes place.

After completion of the intramolecular cyclization step, the reaction mixture is washed first with water to remove the acid catalyst and then with a dilute alkaline solution to remove any remaining catalyst and unreacted acid-ester and/or tetrahydrophthalic anhydride. Suitable dilute alkaline materials useful for this purpose include aqueous sodium hydroxide, aqueous sodium carbonate, and aqueous calcium hydroxide solution. After washing, the recovered material is purified in the usual manner, such as by distillation, solvent extraction, or selective adsorption procedures.

The bicyclic ester-lactone products of this invention are stable liquid compounds which range in color from colorless to a light yellow and which range in viscosity from very fluid to very viscous. The boiling points of these compounds are very high, usually above about 200° C. These bicyclic ester-lactones have good solvent properties and are soluble in heptane, benzene, alcohols, ethers, ketones, and the like but are insoluble in water.

The bicyclic ester-lactones of this invention are advantageously used for a variety of industrial purposes. The bicyclic ester-lactones of this invention are characterized by having low volatility and good viscosity characteristics, therefore, finding use as functional fluids in hydraulic fluid systems as well as vacuum systems. Furthermore, the bicyclic ester-lactones of this invention find extensive use as plasticizers for various synthetic resins, particularly the polyvinyl halide resins such as polyvinyl chloride, to form softened compositions of increased resiliency and flexibility which is retained at low temperatures as well as at high temperatures. The bicyclic ester-lactones of this invention are also compatible with other polymers such as polyvinyl butyral, cellulose acetate, cellulose acetate butyrate, polystyrene and certain polyacrylates.

The advantages, desirability and usefulness of the present invention are illustrated by the following examples.

*Example 1*

In this example, butyl 5-methyl-6-oxa-7-oxobicyclo [3.2.1.]octane-2-carboxylate, e.g., bicyclic ester-lactone, was prepared from 7,9-dioxo-4-methyl-8-oxabicyclo [4.3.0]-3-nonene, i.e., 4-methyl-$\Delta^4$-tetrahydrophthalic anhydride, and $n$-butanol using 0.3 mole of each reactant. The reactants were placed in a small flask and heated at a temperature in the range of 100–120° C. with stirring for a period of 1 hour. During this heating step, the acidity of the reaction mixture was checked periodically by titrating 0.5 ml. portions of the mixture with 0.1 N-sodium hydroxide. The reaction mixture was then cooled and 1.8 g of sulfuric acid added to the reaction flask and heated for an additional 1.5 hours at a temperature of 120° C. The acidity of the reaction mixture was periodically checked in this heating step as was done in the first heating step by titration with sodium hydroxide. At the end of 1.5 hours, the reaction mixture was dissolved in 50 ml. of diethyl ether and washed with 50 ml. of water followed by washing with 50 ml. of 5% sodium hydroxide and two 50 ml. portions of water. The combined water phases were then washed with two 25 ml. portions of diethyl ether. The combined ether solutions were distilled under vacuum through a packed column to obtain the butyl 5-methyl-6-oxa-7-oxobicyclo [3.2.1]octane-2-carboxylate boiling at 138–143° C./0.2 mm. Hg and having a refractive index $n_D^{25}$ 1.4743. Analysis of the product was found to be 66.3% carbon and 8.1% hydrogen as compared with calculated values of 65.0% carbon and 8.4% hydrogen.

*Example 2*

In this example, the butyl 5-methyl-6-oxa-7-oxobicyclo [3.2.1]octane-2-carboxylate was prepared using the same reactions and conditions as were used in Example 1 except that the sulfuric acid catalyst was replaced with 1 g. of 70% perchloric acid and the lactonization step was conducted at a temperature of 80° C. for a period of time of 0.8 hour.

*Example 3*

In this example, tridecyl 5-methyl-6-oxa-7-oxobicyclo-[3.2.1]octane-2-carboxylate was prepared from 7,9-dioxo-4-methyl-8-oxabicyclo[4.3.0]-3-nonene and tridecanol using 0.32 mole of each reactant. The reactants were placed in a small flask and heated at a temperature of 120° C. for 1 hour. Immediately thereafter, 100 ml. of formic acid was added to the hot reaction mixture and the heating continued for a period of 6 hours while maintaining the temperature at 100° C. Thereafter, the reaction mixture formed was diluted with 100 ml. of diethyl ether and washed with 100 ml. of water followed by washing with 100 ml. of a 5% solution of sodium hydroxide and another washing with 100 ml. of water. The washed solution obtained was distilled, first in a still head to effect removal of the diethyl ether and the entrained water, and then at reduced pressure to obtain the tridecyl 5-methyl-6-oxa-7-oxobicyclo[3.2.1]octane - 2 - carboxylate boiling at 189–194° C./0.25 and having a refractive index $n_D^{25}$ 1.4712. The yield of the bicyclic ester-lactone amounted to 61%. The product had an analysis of 72.2% carbon and 10.6% hydrogen as compared with calculated values of 72.2% carbon and 10.4% hydrogen. The proposed structure was confirmed by an inspection of the infrared spectrum of the product.

*Example 4*

In this example, the tridecyl 5-methyl-6-oxa-7-oxobicyclo[3.2.1]octane-2-carboxylate was prepared using the same reactants and procedures as in Example 3 except that the heating in the first step was conducted for a period of time of 1.3 hours instead of 1 hour and the formic acid catalyst was replaced with 70% perchloric acid catalyst in an amount of 1 g. and the lactonization was conducted at a temperature in the range of 100–120° C. for a period of time of 0.5 hour.

Reasonable variation and modification of the invention as described are possible, the essence of which is that there have been provided: (1) a process for esterifying alkyl-$\Delta^4$-tetrahydrophthalic anhydrides to form acid-esters thereof, (2) a process for reacting an alkyl-$\Delta^4$-tetrahydrophthalic anhydride with a monohydric alcohol to form a bicyclic ester-lactone, and (3) said bicyclic ester lactones as new compounds.

We claim:

1. The method for producing a bicyclic ester-lactone, said method comprising (1) monoesterifying an alkyl-$\Delta^4$-tetrahydrophthalic anhydride of the formula

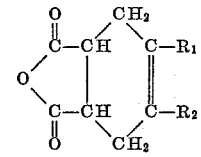

wherein $R_1$ is the group $-C_nH_{2n+1}$, where $n$ is a whole number from 0 to 6, and $R_2$ is an unsubstituted alkyl group containing up to 6 carbon atoms, with a monohydric unsubstituted alkanol containing up to 17 carbon atoms, wherein said anhydride and said unsubstituted alkanol are present in about mole equivalent amounts, at a temperature of from about 50° to about 150° C. to form the acid-ester having the formula

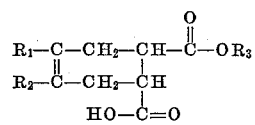

wherein $R_1$ and $R_2$ are as aboved defined, and $R_3$ is an unsubstituted alkyl radical containing up to 17 carbon atoms, and (2) then intramolecularly cyclizing said acid-ester at a temperature of from about room temperature to about 150° C. in the presence of from about 0.1 to about 5 weight percent, based on the said anhydride initially charged to the reaction mixture, of perchloric acid, as catalyst, to form a bicyclic ester-lactone defined by the structural formula

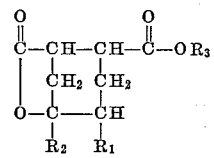

wherein $R_1$, $R_2$ and $R_3$ are as above defined, and recovering the said bicyclic ester-lactone as product.

2. The method for producing butyl 5-methyl-6-oxa-7-oxobicyclo[3.2.1]octane-2-carboxylate comprising (1) monoesterifying 7,9-dioxo-4-methyl-8-oxabicyclo[4.3.0]-3-nonene with n-butanol, wherein the reaction components are present in about mole equivalent amounts, at a temperature of from about 50° to about 150° C. to form an acid-ester product and (2) then intramolecularly cyclizing the acid-ester product at a temperature of from about room temperature to about 150° C. in the presence of from about 0.1 to about 5 weight percent, based on the 7,9 - dioxo-4-methyl-8-oxabicyclo[4.3.0]-3 - nonene initially charged to the reaction mixture, of perchloric acid, as catalyst, to form the bicyclic ester-lactone product butyl 5-methyl - 6 - oxa-7-oxobicyclo[3.2.1]octane-2- carboxylate, and recovering the said bicyclic ester-lactone as product.

3. The method for producing tridecyl 5-methyl-6-oxa-7-oxobicyclo[3.2.1]octane-2-carboxylate comprising (1) monoesterifying 7,9-dioxo-4-methyl-8-oxabicyclo[4.3.0]-3-nonene with tridecanol, wherein the reaction components are present in about mole equivalent amounts, at a temperature of from about 50° to about 150° C. to form the acid-ester product and (2) then intramolecularly cyclizing the acid-ester product at a temperature of from about room temperature to about 150° C. in the presence of from about 0.1 to about 5 weight percent, based on the 7,9-dioxo-4-methyl-8-oxabicyclo[4.3.0]-3-nonene initially charged to the reaction mixture, of perchloric acid, as catalyst, to form the bicyclic ester-lactone product tridecyl 5-methyl-6-oxa-7-oxobicyclo[3.2.1]-octane-2-carboxylate, and recovering the said bicyclic ester-lactone as product.

No references cited.

WALTER A. MODANCE, *Primary Examiner.*